(12) United States Patent
Pagani

(10) Patent No.: US 10,378,142 B2
(45) Date of Patent: Aug. 13, 2019

(54) SCENTED DEVICE FOR LAUNDRY TO BE USED IN DRYER MACHINES

(71) Applicant: CASTELBERG TECHNOLOGIES S.R.L., Grumello del Monte (BG) (IT)

(72) Inventor: Carlo Pagani, Castelli Calepio (IT)

(73) Assignee: Castelberg Technologies S.r.l., Grumello del Monte (BG) (IT)

( * ) Notice: Subject to any disclaimer, the term of this patent is extended or adjusted under 35 U.S.C. 154(b) by 53 days.

(21) Appl. No.: 15/567,842

(22) PCT Filed: Apr. 18, 2016

(86) PCT No.: PCT/IB2016/052193
§ 371 (c)(1),
(2) Date: Oct. 19, 2017

(87) PCT Pub. No.: WO2016/166736
PCT Pub. Date: Oct. 20, 2016

(65) Prior Publication Data
US 2018/0112347 A1    Apr. 26, 2018

(30) Foreign Application Priority Data

Apr. 17, 2015  (IT) .............................. BG2015A0022

(51) Int. Cl.
*D06F 58/00*    (2006.01)
*D06F 58/20*    (2006.01)
*D06F 58/04*    (2006.01)
*C11D 17/04*    (2006.01)
*C11D 3/00*    (2006.01)
*C11D 3/50*    (2006.01)
*B29C 45/00*    (2006.01)

(52) U.S. Cl.
CPC .......... *D06F 58/203* (2013.01); *C11D 3/0068* (2013.01); *C11D 3/50* (2013.01); *C11D 17/047* (2013.01); *D06F 58/04* (2013.01); *B29C 45/00* (2013.01); *Y10T 428/218* (2015.01)

(58) Field of Classification Search
CPC .. Y10T 428/218; D06F 58/203; C11D 17/047
USPC ...................................................... 428/66.6
See application file for complete search history.

(56) References Cited

FOREIGN PATENT DOCUMENTS

GB        1548000    *   7/1979

* cited by examiner

*Primary Examiner* — Alexander S Thomas
(74) *Attorney, Agent, or Firm* — R. Ruschena Patent Agent, LLC

(57) ABSTRACT

Scented device (1) for laundry to be used in a dryer machine, the scented device being made in elastomeric material, comprising a body (2) and being characterized by a plurality of lamellar rings (3) which are scented and flexible, layered one above the other to give the device (1) a rounded shape.

9 Claims, 2 Drawing Sheets

SCENTED DEVICE FOR LAUNDRY TO BE USED IN DRYER MACHINES

BACKGROUND OF THE INVENTION

1. Field of the Invention

The present invention relates to a scented device for laundry to be used in dryer machines. In particular, the scented device, object of the present invention, is realized in rounded, spherical or cylindrical shape so that it can move freely and homogeneously inside a dryer machine.

2. Brief Description of the Prior Art

In particular, recently the use of dryer machines in houses, and not only there, has developed considerably. As a consequence, the request for devices able to scent laundry inside the same dryer machines has considerably increased.

At the state of the art there are known devices in scented polymer resins to be used in dryer machines. However, such devices have not been diffused well on the market since they have drawbacks.

The known devices are substantially of two types: a first type which use scented plastic granules inside a plastic container and a second type realized directly in scented plastics of various type. In particular, the scented devices of first type have mainly the drawback that when the dryer machine functions, they generate nasty noises due to the movement of the granules inside the scented device, in addition to the noise caused by the movement of the same device against the walls of the dryer machine. Another drawback is represented by the structure of the same device which comprises a container which has to remain closed hermetically and safely to prevent the granules contained therein to go out and disperse inside the dryer machine and as a consequence in the whole laundry. Therefore, the devices of first type always risk that the same container is opened, accidentally or as a consequence of wear. Such drawback can cause problems to the dryer machine, in addition to the difficulty to remove completely the granules from the laundry, which, since they are very small, are potentially dangerous especially for children who can swallow them.

The scented devices of the second type are realized in scented plastic, generally with fancy shapes which follow aesthetical criteria rather than the technical ones. Such scented devices have been conceived to develop a scenting action, but they have various drawbacks. Specifically, they cause excessive noises during the dryer machine functioning both because they are realized in hard plastic and because they have shapes not suitable to minimize noises. In addition, they are not good in their function, i.e. transferring totally and uniformly the scent to the laundry also because their movement is not suitable apart from being irregular inside the dryer machine.

SUMMARY OF THE INVENTION

Therefore, aim of the present invention is to provide a scented device to be introduced in dryer machines, which solves the drawbacks of the known devices.

At the state of the art there are not known scented devices to be used in dryer machines which have excellent capacity to transfer the scent to the laundry and which do not produce noises during their use in a dryer machine.

The scented device, object of the present invention, has innovative features which allow to obtain both optimal results in transferring the scent to the laundry and to avoid nasty noises during functioning of the dryer machine.

The scented device is obtained by injection moulding by using an elastomeric material, previously scented, in its granular form. Said device in scented elastomer is able to transfer its scent constantly and uniformly to the laundry which is inside the dryer machine during normal functioning and in addition does not cause nasty noises due to its movement. The device is in fact realized in a sufficiently soft and light material (i.e. gum) and with a rounded shape so that it can move easily inside the laundry drying.

According to the present invention, a scented device for dryer machines is described which has the features stated in the appended independent claim.

Other preferred and particularly advantageous embodiments of the invention are described according to the features stated in the appended dependent claims.

BRIEF DESCRIPTION OF THE DRAWINGS

The present invention will be described in the following by means of the following drawings as a way of not limiting example.

DETAILED DESCRIPTION OF THE PREFERRED EMBODIMENTS

Figure 1:
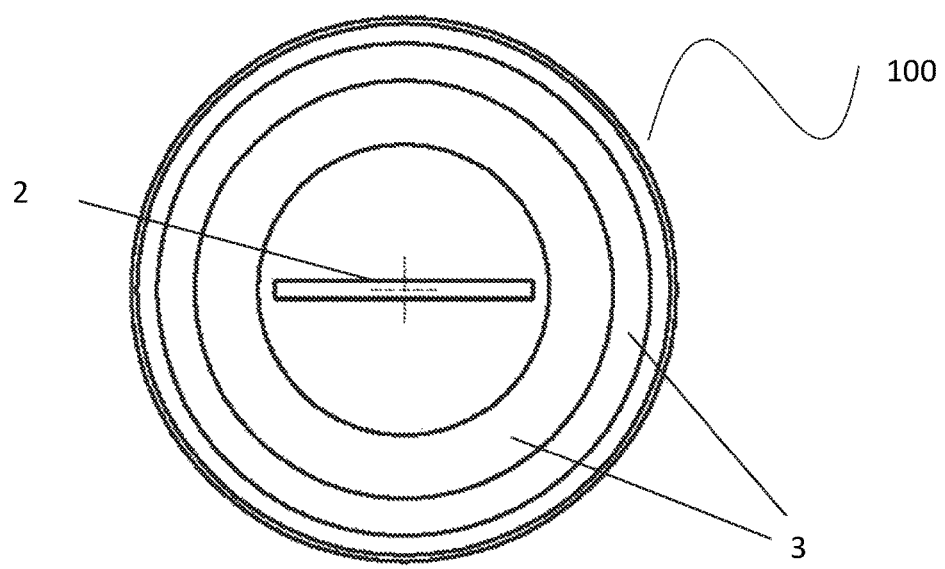
FIG. 1 shows a plan view of the scented device according to an embodiment of the present invention.
Figure 2:
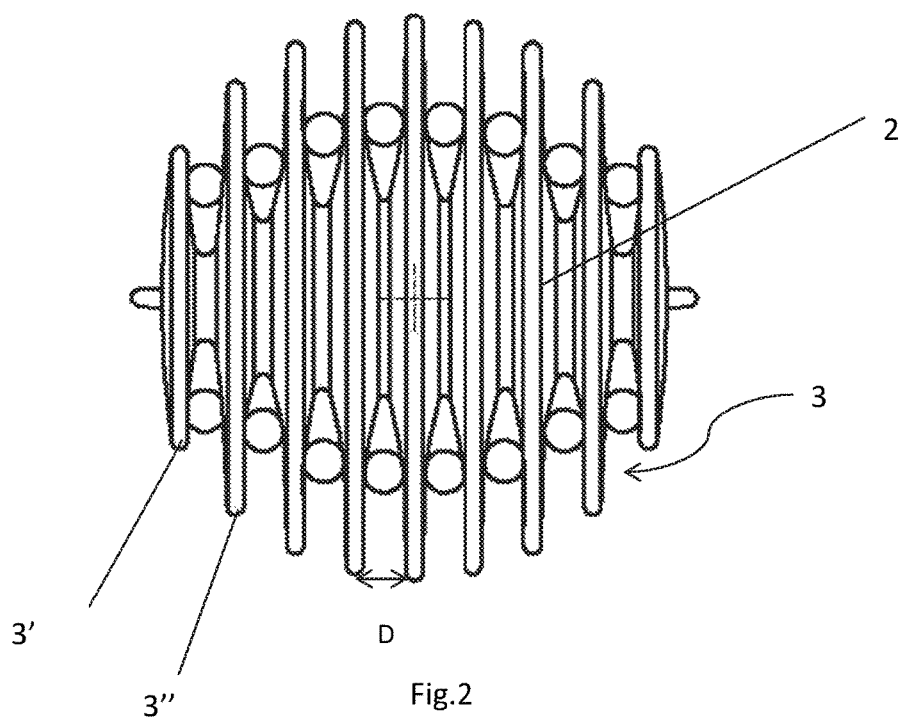
FIG. 2 shows a side view of the device of FIG. 1.
Figure 3:
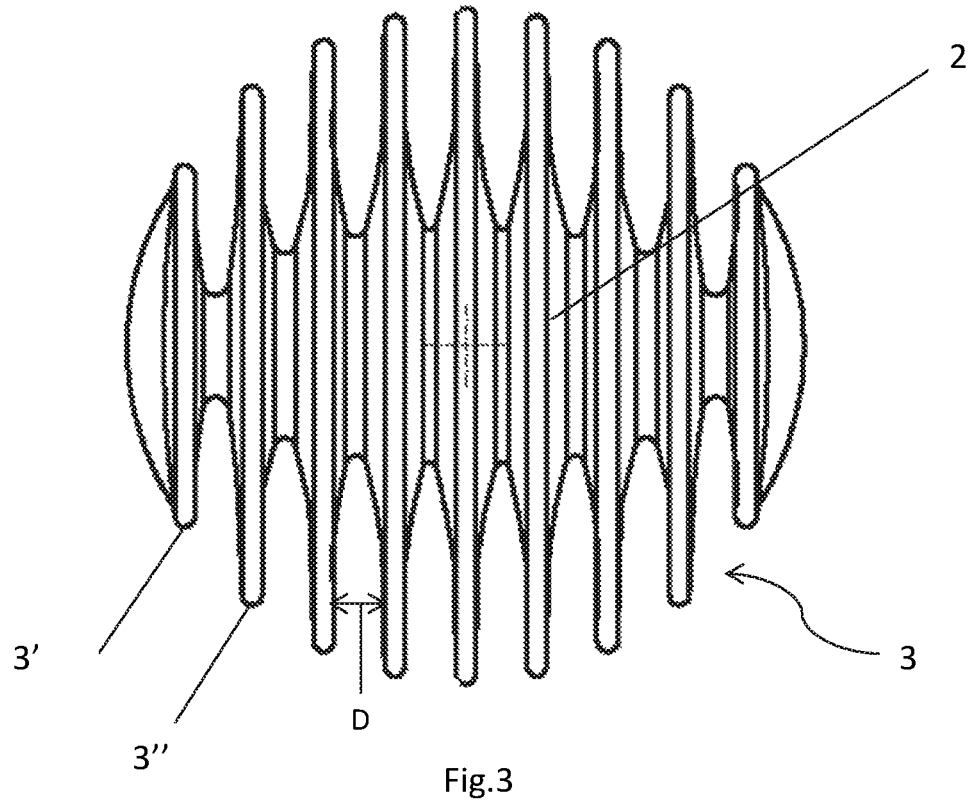
FIG. 3 shows a second side view of the device of FIG. 1.

An example of scented device, absolutely not limiting and indicated as a whole with reference number 1, is represented in FIGS. 1 to 3. The scented device 1 comprises a body 2 of substantially rounded, spherical or cylindrical shape and a plurality of very thin lamellar rings 3, about 2 mm thick, flexible and layered one above the other. In said plurality of lamellar rings 3 a first lamellar ring 3' and the next lamellar ring 3" can be separated laterally with respect to each other (in particular, with respect to the flat side of the rings Advantageously, said rings 3', 3" can be positioned at a distance D between them, as shown in FIGS. 2 and 3. Such distance D is preferably constant between couples of consecutive lamellar rings 3', 3".

The lamellar rings 3 are in variable number between five and thirteen, preferably nine. In the example shown in the appended drawings the number of the lamellar rings is nine.

Said lamellar rings 3 provide a very great surface with minimum thickness which allows a fast emission and transfer of scent to laundry. It is in fact known that a fragrance goes out more rapidly and in shorter times from plastic products having shapes with thinner thickness than from the ones with greater thickness. Moreover, such advantage is guaranteed also by the distance D between couples of consecutive lamellar rings 3', 3", which favors the passage of air produced by the dryer machine during its functioning and as a consequence also a greater contact surface. Moreover, the speed of emission of a scent is directly proportional to the greater extension of the surface of the plurality of lamellar rings 3.

Also, the flexibility of the plurality of lamellar rings 3 facilitates greatly the transfer of fragrance to the laundry.

The scented device 1 is obtained by means of an improved moulding by means of injection presses and in faster times for minimized thicknesses of lamellar rings, thanks to the use of an elastomeric material having a somewhat low hardness, however between 70 and 95, using a Shore durometer type A. Such elastomer which constitutes the lamellar rings forming the scented device 1, is such that it is not very hard, also thanks to the flexibility of the lamellae in order not to cause excessive noises during functioning of the dryer machine, but at the same time, it is able to withstand high working temperatures of the dryer machine (about 100° C.).

The elastomeric material (elastomeric "compound") used in the scented device 1 is also suitably studied to optimize the scenting features contained therein by considering the need, during the formation steps of the device 1, of a start softening temperature of elastomer about 100° C. and an injection moulding temperature which cannot exceed 180° C. In fact, very high temperatures in moulding steps would damage irreparably the fragrance inside the elastomer. On the other hand, softening temperatures lower than 100° C. are not acceptable since temperatures next to 100° C. develop inside the dryer machines.

Therefore, the scented device 1 object of the present invention has the advantage of minimizing noises inside the dryer machines, both by means of its rounded shape which allows a great regularity and uniformity of movement, and by means of the flexibility of the lamellar rings, at a distance with respect to each other and realized with minimum thicknesses as a function of the hardness of the "compound" (a preferred value is about 70 using a Shore durometer type A, according to which it is possible to adopt a substantially equal to 2 mm thickness of the lamellar rings) to allow the lamellar rings to bend when in contact to the walls of the machine and in this way to deaden the impact and the consequent noise.

Even if at least an embodiment was described in the brief and detailed description, it is to be intended that there exist many other variants in the protection scope of the invention. Further, it is to be intended that said embodiment or embodiments described are only example and do not limit in any way the protection scope of the invention and its application or configurations. The brief and detailed description give instead the experts in the field a convenient guide to implement at least an embodiment, while it is to be intended that many variations of the function and elements assembly here described can be made without departing from the protection scope of the invention encompassed by the appended claims and/or technical/legal equivalents thereof.

The invention claimed is:

1. A scented device (1) for laundry to be used in a dryer machine, the scented device being made in elastomeric material, comprising a body (2) and being characterized by a plurality of lamellar rings (3) which are scented and flexible, layered one above the other to give the device (1) a rounded shape; and wherein said lamellar rings (3) are separated with respect to each other.

2. The scented device (1) according to claim 1 wherein said lamellar rings (3) are positioned at a distance (D) between a first lamellar ring (3') and a following lamellar ring (3") of said plurality of lamellar rings (3).

3. The scented device (1) according to claim 2, wherein a number of lamellar rings of said plurality of lamellar rings (3} is between five and thirteen.

4. The scented device (1) according to claim 3, wherein said number of lamellar rings is equal to nine.

5. The scented device (1) according to claim 4, wherein said lamellar rings have a thickness substantially equal to 2 mm.

6. The scented device (1) according to claim 1, wherein said elastomeric material has a hardness between 70-95, using a Shore durometer type A.

7. The scented device (1) according to claim 6, wherein said elastomeric material has a hardness equal to 70, using a Shore durometer type A.

8. The scented device (1) according to claim 6, wherein said elastomeric material has a start softening temperature not lower than 100° C.

9. The scented device (1) according to claim 6, wherein said elastomeric material has an injection molding temperature not higher than 180° C.

* * * * *